US008925576B2

(12) United States Patent
Spliethoff et al.

(10) Patent No.: US 8,925,576 B2
(45) Date of Patent: Jan. 6, 2015

(54) DEVICE FOR ACTUATING A PROCESS VALVE FOR USE IN FOODSTUFFS TECHNOLOGY

(75) Inventors: Norbert Spliethoff, Oelde (DE); Torsten Reich, Kamen (DE)

(73) Assignee: APV Rosista GmbH, Unna (DE)

( * ) Notice: Subject to any disclaimer, the term of this patent is extended or adjusted under 35 U.S.C. 154(b) by 1573 days.

(21) Appl. No.: 12/327,661

(22) Filed: Dec. 3, 2008

(65) Prior Publication Data

US 2009/0140191 A1 Jun. 4, 2009

(30) Foreign Application Priority Data

Dec. 4, 2007 (DE) .......................... 10 2007 058 251

(51) Int. Cl.
F16K 31/02 (2006.01)
F16K 21/02 (2006.01)
F15B 13/04 (2006.01)

(52) U.S. Cl.
CPC ............. *F15B 13/0405* (2013.01); *F16K 21/02* (2013.01)
USPC ....... 137/486; 137/613; 137/614.18; 251/284

(58) Field of Classification Search
USPC .............. 137/613, 486–491, 614.18; 251/284
See application file for complete search history.

(56) References Cited

U.S. PATENT DOCUMENTS 4,438,049 A * 3/1984 Ammons .................. 137/599.16
5,474,371 A * 12/1995 Shinomiya ................. 303/117.1
5,924,284 A * 7/1999 Shimada et al. ................ 60/550
5,988,119 A * 11/1999 Trublowski et al. ........ 123/41.31
7,913,930 B2 * 3/2011 Theeuwen et al. ............ 239/164

FOREIGN PATENT DOCUMENTS

| CN | 1437679 | 8/2003 |
|---|---|---|
| CN | 1914446 | 2/2007 |
| DE | 4035017 C1 | 1/1992 |
| DE | 4243111 B4 | 2/2004 |
| DE | 20318192 U1 | 2/2004 |
| EP | 0545338 B1 | 2/1995 |
| EP | 0869104 A1 | 10/1998 |
| EP | 0462432 B1 | 12/1998 |
| EP | 1106884 A2 | 6/2001 |
| EP | 1068932 B1 | 7/2005 |
| EP | 1712821 A1 | 10/2006 |

(Continued)

OTHER PUBLICATIONS

European Search Report issued on Mar. 6, 2013 in the European Patent Application No. 08020998.4 (published No. 2068052).

(Continued)

*Primary Examiner* — Kevin Lee
(74) *Attorney, Agent, or Firm* — Baker & Hostetler LLP

(57) ABSTRACT

The invention relates to a device (100) for actuating a process valve that has a first cylinder and a second cylinder, comprising at least one first control valve arrangement (102) that has at least a connector for a line to the first cylinder of the double-seat valve, an intake-air connector and an exhaust-air connector, and comprising a second control valve arrangement (103) that has at least a connector for a line to the second cylinder of the double-seat valve, a connector for an intake-air line and a connector for an exhaust-air line, wherein separate exhaust-air lines (104, 105) are provided for the first and the second control valve arrangement (102, 103).

19 Claims, 6 Drawing Sheets

(56) References Cited

FOREIGN PATENT DOCUMENTS

| | | |
|---|---|---|
| GB | 2328524 A | 2/1999 |
| WO | 02093058 A1 | 11/2002 |
| WO | 2007105020 A1 | 9/2007 |

OTHER PUBLICATIONS

European Search Report issued on Mar. 6, 2013 in the European Patent Application No. 08020999.2 (published No. 2068053).
European Search Report issued on Mar. 6, 2013 in the European Patent Application No. 08021000.8 (published No. 2068059).

* cited by examiner

US 8,925,576 B2

DEVICE FOR ACTUATING A PROCESS VALVE FOR USE IN FOODSTUFFS TECHNOLOGY

PRIORITY

This application claims priority of German Patent Application No. DE10 2007 058 251.1 filed in Germany on Dec. 4, 2007, the entire contents of which are incorporated herein by reference.

FIELD OF THE INVENTION

The invention relates to a device for actuating a process valve for use in foodstuffs technology, having a first cylinder and a second cylinder, with at least one first control valve arrangement that has at least a connector for a line to the first cylinder of the double-seat valve, an intake-air connector and an exhaust-air connector. The device for actuating a process valve also has a second control valve arrangement, with at least a connector for a line to the second cylinder of the double-seat valve, a connector for an intake-air line and a connector for an exhaust-air line provided for the first and the second control valve arrangement.

BACKGROUND OF THE INVENTION

Devices for actuating a process valve for use in foodstuffs technology are known in the art, e.g. the control unit distributed by the present applicant for the double-seat valve DELTA DA3+.

Control units or devices for actuating a double-seat valve are disclosed for instance in U.S. Pat. No. 5,435,853.

The known devices for actuating a process valve (for example, a double-seat valve), for use in foodstuffs technology, that has a first cylinder and a second cylinder, have a first control valve having a connector for a line to the first cylinder of the double-seat valve, an intake-air connector and an exhaust-air connector, and have at least one further, or a second, control valve having at least a connector for a line to the second cylinder of the double-seat valve, a connector for an intake-air line and a connector for an exhaust-air line.

In the case of the known devices for actuating a process valve, the exhaust air of the various control valves is taken away collectively, i.e. the exhaust-air lines of the individual control valves are interconnected and have a common outlet into the environment. This can give rise to the disadvantage that the venting of air from one control valve via the common exhaust-air line causes compressed air to come in via another control valve that has connected the exhaust-air line to the cylinder chamber normally actuated by it.

Although, in this position, the exhaust air from the cylinder chamber is intended to escape outwards, the compressed air present in the common exhaust-air line can result in unintentional actuation of the process valve by the control valve that is switched to exhaust ventilation. Unintentional, short-duration opening of one of the valve stems can be effected as a result. This is particularly undesirable in foodstuffs technology, and can constitute a safety-relevant hazard for the quality of the foodstuff, since, for example, contamination of the leakage cavity can occur as a result.

A further resultant disadvantage is that there can be a loss of product, owing to the unintentional lifting motion of one of the valve stems.

SUMMARY OF THE INVENTION

Accordingly it is an object of the invention to provide a device for actuating a process valve, according to the preamble of claim 1, wherein an unintentional lifting motion of one of the valve stems of the process valve to be actuated, caused by the exhaust air from another control valve arrangement of the device for actuating the process valve, is prevented.

The object of the invention is achieved by means of a device according to the features of claim 1. Advantageous developments of the invention are specified in the dependent claims.

According to an embodiment of the invention, there is specified a device for actuating a process valve (for example, a double-seat valve) that has a first cylinder and a second cylinder, comprising at least one first control valve arrangement that has at least a connector for a line to the first cylinder of the double-seat valve, an intake-air connector and an exhaust-air connector, and comprising a second control valve arrangement that has at least a connector for a line to the second cylinder of the double-seat valve, a connector for an intake-air line and a connector for an exhaust-air line, wherein separate exhaust-air lines are provided for the first and the second control valve arrangement.

In the context of the present invention, the use of the nomenclature first, or second, etc. in relation to the cylinders and the control valve arrangements is not intended to express any priority, but to denote any cylinder or any control valve arrangement. Rather, the nomenclature first, or second, etc. is intended to express the fact that there are various cylinders or control valve arrangements, namely, at least two, and preferably three or more. The respective control valve arrangements serve to actuate any function of the process valve in each case.

The device, according to the invention, for actuating a process valve has the advantage that flowing of the exhaust air from one control valve arrangement over into the exhaust-air line connector of another control valve arrangement is precluded in such a way that an unintentional lifting motion of one of the valve stems is reliably prevented. It is thereby ensured that unintentional opening does not occur.

The device, according to the invention, for actuating a process valve can be present in a circuit arrangement or control unit that is arranged on the process valve, or it can be otherwise connected as a circuit arrangement or control unit to the process valve via electric leads and/or pneumatic lines. Further, it can be integrated in the process valve or a housing.

According to this embodiment of the invention, separate exhaust-air lines are provided for the first and the second control valve arrangement. Owing to the provision of separate exhaust-air lines, an unintentional lifting motion can be reliably precluded, because the separate exhaust-air lines have no connection to one another, and consequently the exhaust air from the one control valve cannot get into the other control valve.

Accordingly the unintended actuation of the valve can be avoided without the need to provide restrictions and/or throttles in the exhaust pipes. This results into lower manufacturing costs and a more reliable performance.

Alternatively, or additionally, according to the invention the device for actuating a process valve can have at least two control units, a first control unit being provided with a first exhaust-air line for actuating the first control valve arrangement, and a second control unit being provided with a second exhaust-air line for actuating the second control valve arrangement.

Alternatively, or additionally, according to the invention a valve can be provided on the line attached to the exhaust-air line connector from one control valve arrangement, which valve prevents exhaust air from another control valve arrangement from entering the exhaust-air line connector of the other control valve arrangement. Advantageously, such a valve can be a check valve, which allows the exhaust air to come out of the control valve arrangement, but prevents a compressed air (for example the exhaust air of another control valve arrangement) from entering the exhaust-air line connector. Likewise, it is also possible to provide a shut-off valve, which is closed as a precaution during the exhaust ventilation of another control valve arrangement.

Alternatively, or additionally, according to the invention it is also possible to provide a throttle valve, which reduces a possible pressure in such a way that an unintentional lifting motion of the corresponding valve stem is reliably prevented.

The provision of valves in the exhaust-air lines is preferred if only a common exhaust air outlet is to be provided in the device for actuating a process valve. If a plurality of outlets is provided, it is preferred to separate the exhaust-air lines from one another. It is clear that not all exhaust-air lines need be separated from one another, but only those that can cause a short-duration, unintentional lifting motion.

According to the invention, separate exhaust-air lines can be provided for the first and the second control valve arrangement. This embodiment has the advantage that an unintentional actuation of the actuated process valve by the exhaust air of a control valve arrangement can be reliably prevented in the case of a simple structure.

Alternatively, or additionally, according to the invention at least one valve can be provided in the line that connects the exhaust-air line connector of the first control valve arrangement to the exhaust-air line connector of the second control valve arrangement. According to the invention, in this case the valve provided in the line between the exhaust-air line connectors can be a check valve and/or a shut-off valve and/or a throttle valve. In this case, it is also possible for a plurality of valves to be provided in the lines between the exhaust-air line connectors of the control valve arrangements.

Alternatively, or additionally, according to the invention the process valve can have an upper and a lower valve stem, and the first control valve arrangement can be provided for lifting the lower valve stem, and the second control valve arrangement provided for lifting the upper valve stem.

According to the invention, the device for actuating a process valve can have a third control valve arrangement, for opening the double-seat valve. Clearly, further control valve arrangements can also be provided. In this case, the exhaust-air line connector of the third control valve arrangement can be connected to the exhaust-air line connector of the first control valve or to the exhaust-air line connector of the second control valve arrangement.

According to the invention, the intake-air connectors of at least two, and preferably of all, control valve arrangements are connected to a common compressed-air source or pressure gas source.

According to the invention, the device for actuating a process valve can have a housing, which accommodates the control valve arrangements, and in the base of which the exhaust-air lines are realized. In this case, according to the invention, the housing of the device for actuating a process valve can be an injection-moulded part.

According to the invention, the control valve arrangement(s) can be (electromagnetic) solenoid valves.

According to the invention, the first, second and/or third control valve arrangement can be realized by a control valve, preferably a 3/2-way valve or a 5/2-way valve.

Alternatively, or additionally, according to the invention the first, second and/or third control valve arrangement can have a plurality of control valves, preferably a combination of a plurality of 2/2-way valves, which further are preferably connected according to an equivalent circuit diagram for a 3/2-way valve and/or a 5/2-way valve.

According to the invention, process valve can be a double-seat valve, and the first cylinder of the double-seat valve can be designed for lifting the lower seat, and the second cylinder of the double-seat valve can be designed for lifting the upper seat.

According to the invention, the first and/or second cylinder of the process valve can additionally be designed as a main cylinder for actuating (opening) the process valve.

According to the invention, the process valve can have a further cylinder for actuating (opening) the process valve.

According to the invention, the device for actuating a process valve can be a control unit and/or a circuit arrangement.

The invention also relates to a throttle valve according to a throttle valve for a device, according to the invention, for actuating a process valve, the throttle valve being provided as an intake-air throttle valve or exhaust-air throttle valve in the intake-air line and exhaust-air line, respectively, of a control valve. Such throttle valves can be used for process valves such as, for example, a double-seat valve according to FIG. 2, in which the opening and closing, and possibly the lifting, is initiated by actuating pilot-operated control valve arrangements. Usually, the pilot-operated control valve arrangements are control valves, and preferably solenoid valves. Owing to the provision of a throttle valve in the intake-air line or exhaust-air line, the operating motion can be slowed down. The known throttle valves have a conical seat, in which there engages a tapered end of a valve stem. These throttle valves can close the intake-air line and the exhaust-air line completely, thereby preventing an operating motion of the control valve, and thus of the process valve. This may possibly result in the process valve failing to return to its safety position in the event of a failure of the throttle valve.

Accordingly it is an object of the invention to provide a throttle valve which ensures actuation of the process valve by the control valve even in the closed position of the throttle valve or in a mis-actuation of the control valve.

This object of the invention is achieved by means of a throttle value including a valve seat and a valve member, wherein the throttle valve is realized in such a way that a minimum passage, sufficient for initiating an actuation of the process valve, is ensured in each position of the valve member. Advantageous developments of the invention are specified in the dependent claims.

According to the invention, there is specified a throttle valve for limiting the maximum opening of a control valve that controls a process valve, the throttle valve having a valve seat and a valve member, the throttle valve being realized in such a way that a minimum passage, sufficient for initiating an actuation of the process valve, is ensured in each position of the valve member.

A valve member is considered to be a member used for opening and closing the valve. The valve member can also be named as final control element.

The provision of a minimum passage of the throttle valve ensures that an emergency operation of the process valve is ensured by the throttle valve according to the invention, even in the event of a malfunction of the throttle valve, and, in particular, the process valve can return to its safety position, even in the event of a malfunction of the throttle valve.

German Utility Model DE 203 18 192 U1 discloses a throttle valve wherein the throttle 5 will be active in one flow direction only whereas the bypass 7 will be active in the opposite flow direction only. On the contrary in accordance with the invention, the bypass has to be active in the same flow direction as the flow direction the throttle is active.

According to an embodiment of the invention, there is specified a throttle valve for limiting the maximum opening of a control valve that controls a process valve, the throttle valve having a valve seat and a valve member, and the throttle valve being realized in such a way that a minimum passage, sufficient for initiating an actuation of the process valve, is ensured in each position of the valve member.

According to the invention, the throttle valve can have a housing, and be provided in a line that is directly or indirectly connected to the control valve, the line preferably being provided between a compressed air source for the control valve and the control valve, or between control valve and an exhaust-air outlet, or between the control valve and the process valve.

Alternatively, or additionally, the throttle valve can be integrated in the control valve and/or the process valve and/or a compressed-air source for the control valve and/or the exhaust-air line and/or the intake-air line.

According to the invention, the throttle valve can have a bypass opening. In this case, the bypass opening can be provided in the housing and/or the valve member. Further, according to a development of the invention, a check valve can be provided in the bypass opening.

Alternatively, or additionally, notches and/or grooves and/or webs can be provided in the valve seat and/or the closing surface of the valve member.

Alternatively, or additionally, stop means can be provided to prevent complete closing of the throttle valve. In this case, the stop means can comprise a projection and/or a collar, which is/are preferably realized on the valve stem of the valve member and/or in the valve seat, and cooperates/cooperate with corresponding stops to prevent complete closing of the throttle valve.

According to the invention, the throttle valve can be a seat valve.

According to the invention, the throttle valve can have a conical valve seat and a frusto-conical closing member.

According to the invention, the throttle valve can comprise a diaphragm and/or a bellows and/or a hose.

The invention also relates to a device for actuating a process valve or a double-seat valve, in particular according to any one of the above-mentioned embodiments, wherein a throttle valve, preferably realized according to any one of the preceding embodiments of the invention, is arranged in at least one intake-air line and/or exhaust-air line of a control valve arrangement and/or in a control valve arrangement. In this case, a plurality of throttle valves, preferably realized according to any one of the preceding embodiments of the invention, can be provided according to the invention.

Preferably, at least one throttle valve can be provided, respectively, in the intake-air lines and the exhaust-air lines, a free minimum cross-section preferably being able to be provided in the direction of actuation. In the case of embodiments that provide a bypass for the purpose, a check valve can advantageously be provided in the bypass.

In the case of known control units for actuating process valves for use in foodstuffs technology, the pressure that acts on the valve actuator and that initiates the opening and closing of the process valve is not monitored. What is monitored is the position of the process valve upon actuation, i.e. there is monitoring of whether the process valve opens and/or closes according to the specifications.

The known control units have the disadvantage that a malfunction of the device for actuating a process valve can be detected only at a relatively late stage, which can result in higher servicing costs and/or longer downtimes of the process installations. In addition, the cause of the malfunction cannot be detected immediately. In addition to other possible fault sources, it would be necessary to check the compressed-air function.

Accordingly it is an object of the invention to provide a device for actuating a process valve for a process unit for use in foodstuffs technology, wherein early identification of possible malfunctions is realized.

This object of the invention is achieved according to a device for actuating a process valve. Advantageous developments of the invention are specified in the dependent claims.

According to the invention, there is specified a device for actuating a process valve, which device, in particular, can be enhanced with one or more features of the above-mentioned embodiments of the invention, at least one pressure sensor being provided for monitoring the control pressure for actuation of the process valve.

German Patent DE 42 43 111 B4 discloses a double-seat valve with a pressure sensor. However, the pressure sensor disclosed in section 42 of DE 42 43 111 B4 is provided for monitoring the pressure of a liquid within the sealing 40, 41. On the contrary the pressure sensor in accordance with the invention is provided for monitoring the pressure of the control gas for actuating the valve. According to the invention the pressure of a gas is monitored whereas the prior art proposes to monitor the pressure of a liquid.

According to the invention, the control air pressure can be monitored by means of the pressure sensor, and evaluated in dependence on the operating state of the device for actuating a process valve and the operating state of the process valve. For this purpose, the current control air pressure is preferably acquired in the feed line to the valve actuator, by means of a pressure sensor arranged therein.

Preferably, a comparison device can be provided, which compares the acquired measurement values with set reference values and/or with reference values stored in a storage device. The storage device can be integrated into the pressure sensor and/or into the device for actuating the process valve. Preferably, the storage device is integrated into an electronic module of the control unit, which module simultaneously supplies the pressure sensor and/or other sensors with energy and/or signals and/or receives and/or evaluates their measurement signals. If the comparison device detects a variance between the acquired values and the reference values that is below a threshold of a maximally tolerated variance, a signal, or message, is generated, which constitutes a so-termed diagnostic message. The state of the valve actuation can be assessed on the basis of the diagnostic message. In particular, it is possible to identify whether the air supply of the valve actuator is within the reference range. The user is thereby provided with an efficient diagnostic instrument that makes it possible to detect within a very short period of time, i.e. directly or immediately, e.g. in the case of a malfunction such as, for example, exceeding of the valve operating times or a failure of the process valve, whether the control air pressure constitutes the possible cause of the fault. Hence, the appropriate counter-measures can be initiated very rapidly, enabling a possible stoppage of the installation to be kept as short as possible.

For example, in the case of a slow lowering of the control air pressure over a certain period of time, a warning to that effect can be given to the operator/user before any total failure occurs, the operator/user then being able to take appropriate precautions, on the basis of the information, so that a failure of the valve, and thus stoppage of the installation, can be prevented. Precautionary, preventive maintenance measures can also be initiated if the characteristic of the control air pressure exceeds certain limit values.

The fault message, or the exceeding of a certain limit value, of a variance between a measurement value and a reference value of the control air pressure can be indicated, as a signal or message, directly on the control unit, and/or can be relayed to the central control system, e.g. to a programmable controller or to a process management system. The manner in which this signal is relayed depends on the type of actuation of the control unit or of the circuit arrangement, and can thus be effected either by means of a direct signal or, alternatively, also through appropriate communication protocols, e.g. field bus protocols such as AS interface, Profibus, DeviceNet, CClink, or similar.

The embodiments of the invention that comprise a pressure sensor can have the advantage that, for example through the analysis of previously recorded characteristics and comparison of these characteristics with current characteristics of the pressure sensor in the actuation of the process valve or control valve, the variance from the characteristics can indicate the need to replace seals or other wearing parts. According to the invention, therefore, it is possible for these wearing parts to be replaced in a timely manner, which avoids rapid servicing on a short time-scale, as well as avoiding prolonged stoppage times. This is particularly important in the case of foodstuffs technology, in which a multiplicity of process valves is required for controlling complex operations.

Also advantageous is the additional information of the control pressure in combination with the actual behaviour of the process valve, whereby further inferences can be made in respect of the functional capability of the installation and the necessity of servicing same.

According to the invention, in the case of the embodiments of the invention that have a pressure sensor, the device for actuating a process valve can have at least one control valve arrangement that comprises an intake-air connector, to which an intake-air line is connected, and/or an exhaust-air line connector, to which an exhaust-air line is connected, and/or has a control line connector, to which there is connected a control line for connection to the valve actuator of a process valve for use in foodstuffs technology, the pressure sensor or a pressure sensor or a plurality of pressure sensors being provided in the intake-air line and/or exhaust-air line and/or control line.

According to the invention, in the case of the embodiments of the invention that have a pressure sensor, the device for actuating a process valve can have a housing comprising a bottom part, in which at least a portion of the intake-air line and/or of the exhaust-air line and/or of the control line is realized.

According to the invention, in the case of the embodiments of the invention that have a pressure sensor, a comparison device can be provided for comparing the acquired measurement values of the pressure sensor with set reference values and/or with reference values stored in a storage device.

According to the invention, in the case of the embodiments of the invention that have a pressure sensor, there can be provided a storage device that is preferably integrated in the pressure sensor and/or in the device for actuating a process valve.

According to the invention, in this case the storage device can be integrated in an electronic module of the device for actuating a process valve (for example, a control unit), which module is simultaneously realized and designed for supplying the pressure sensor and/or other sensors with energy and/or signals and/or for receiving and/or evaluating their measurement signals.

According to the invention, the pressure sensor can be a piezoresistive pressure sensor, a piezoelectric pressure sensor, a frequency-analog pressure sensor, a pressure sensor having a Hall element, a capacitive pressure sensor, an inductive pressure sensor, or a pressure sensor having a strain gauge. Other pressure sensors having an electrical output signal, which are known to persons skilled in the art, can be used alternatively or in addition.

According to a preferred embodiment of the invention, the device has a piezoresistive pressure sensor. The sensor can measure a relative pressure or an absolute pressure. Preferably, the pressure sensor is arranged and/or connected in such a way that it measures a relative pressure, the measuring arrangement preferably being arranged in the form of a bridge circuit such as, for example, corresponding to a Wheatstone measuring bridge, in order to obtain a measurement value of greater accuracy. The pressure sensor preferably outputs an analog output signal. According to a preferred embodiment of the invention, the pressure sensor can be arranged on an electronic printed circuit board having a circuit arrangement for amplifying the output signal. The printed circuit board can further be encapsulated, preferably, in a plastic housing. The sensor, by means of the housing, which is preferably realized as an injection-moulded part, can be mounted, with its compressed-air connector, on the control air line between the control valve arrangement and the process valve actuator in the base of the device for actuating the process valve. In this case, the sensor can be connected, via an appropriate cable, to the electronic module, via which, preferably, the voltage supply and signalling can be effected. The calibration of the sensor can be effected by means of the electronic module during the fitting of the control unit, in that either a one-point, or a two-point or a multi-point calibration is performed, in that either one or two or a plurality of differing external pressures is/are applied to the sensor, the calibrating pressures preferably being at the start and end of the measurement range. In the case of more than 2 calibration points, they can also preferably be distributed uniformly over the measurement range, in order that a corresponding accuracy can be achieved.

The pressure sensor can have an analog and/or digital output signal, which is a measure of the acquired air pressure.

According to the invention, an evaluation unit can be provided for monitoring and/or evaluating the control air pressure, preferably in order to provide a long-term diagnosis of the valve state. In this case, a signal, or a message, of the evaluation unit is displayed directly on the control unit and/or is relayed to the central control system, for example to a programmable controller or to a process management system. During a first activation of the process valve by the device for actuating the process valve (for example, by means of the control unit, or the circuit arrangement), valve-specific parameters such as, for example, control air pressure, valve lift of the main actuator or lifts of the individual actuators and the movement time during the entire opening and closing operation, can be recorded and stored, as value pairs/characteristics, in the storage device.

The recorded value pairs/characteristics correspond to particular valve states. In the course of the period of operation of the valve, these characteristics/value pairs can be re-recorded at predetermined intervals of time and compared with the characteristics/value pairs determined and stored during the first and/or an earlier activation. If, between the data to be compared, there is found a variance that exceeds a certain limit value, a corresponding indication/message is generated.

According to the invention, there is also specified a process valve having a device for actuating a process valve and/or having a throttle valve according to any one of the above-mentioned embodiments of the invention. In this case, according to the invention the process valve can be a single-seat valve, a double-seat valve, a disc valve, a butterfly valve or a flap valve.

BRIEF DESCRIPTION OF THE DRAWINGS

The invention is described more fully in the following with reference to the exemplary embodiments shown in the figures.

Figure 1:
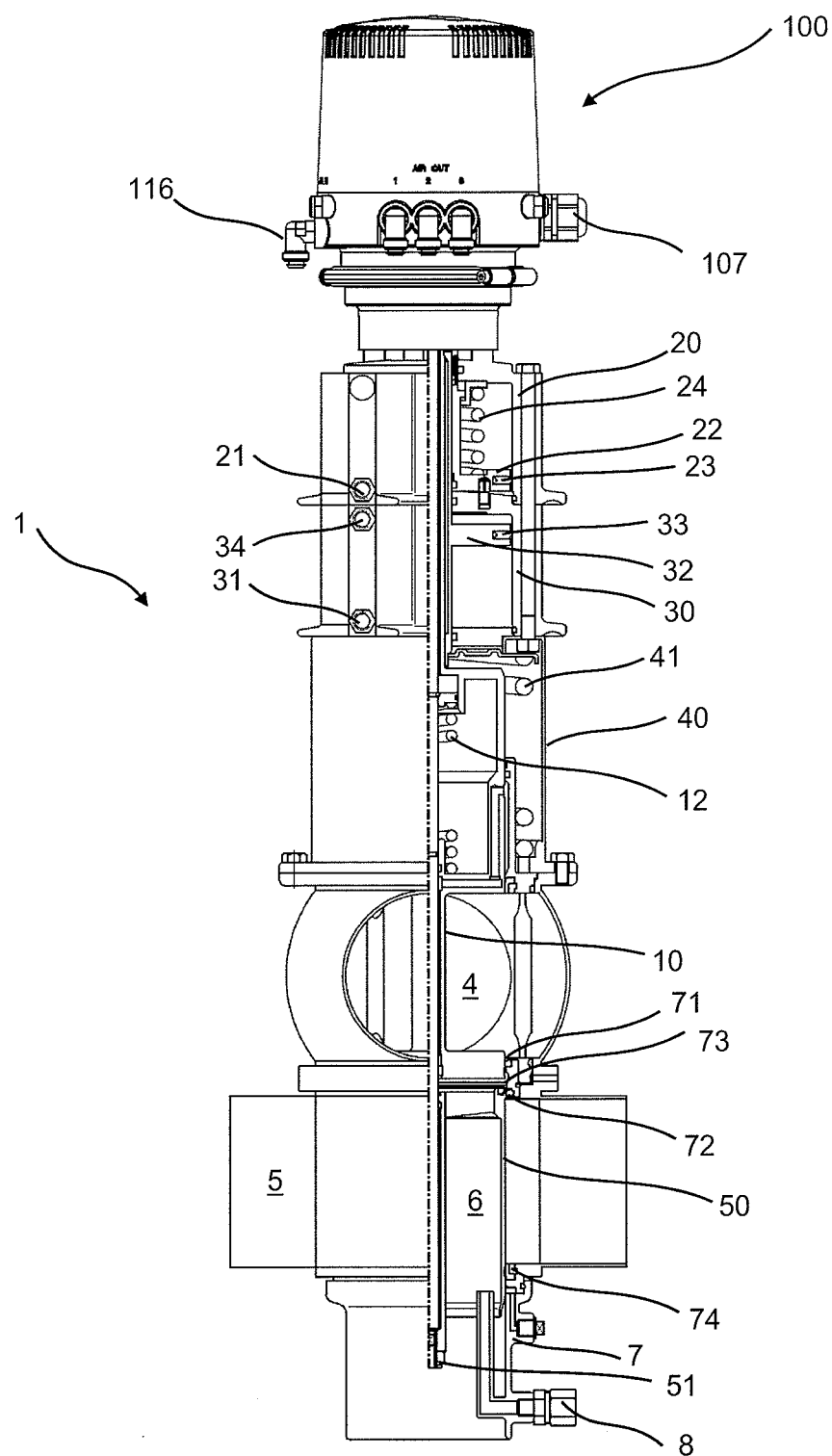
FIG. 1 is a partially cut-away side view of a double-seat valve according to the invention, having a control unit according to the invention.

The following references are used in the description of the exemplary embodiments:
1 double-seat valve
2 stop screw (optical position indicator)
3 connecting rod (can also be named as tie rod)
4 pipeline
5 pipeline
6 leakage cavity
7 drainage pipe
8 cleaning connector
10 upper valve stem
11 coupling (upper valve stem)
12 central spring
20 cylinder (for lower seat lift)
21 connector (compressed air, pressure gas, etc. for lower seat lift)
22 piston (lower seat lift)
23 piston seal
24 return spring
30 main cylinder (for upper seat lift and opening the process valve)
31 connector (compressed air, pressure gas, etc. for upper seat lift)
32 piston (upper seat lift, opening the process valve)
33 piston seal
34 connector (opening the process valve)
40 spring cylinder
41 main closing spring
50 lower valve stem
51 coupling (lower valve stem)
60 seat lantern
71 upper seat seal
72 lower seat seal
73 middle seal
74 lower stem seal
75 upper stem seal
100 device for actuating (also control unit or circuit arrangement)
101 control valve (third; for opening the process valve)
102 control valve (first; for lifting the upper valve stem)
103 control valve (second; for lifting the lower valve stem)
104 exhaust-air line (for taking away the exhaust air from the first and the third control valve)
105 exhaust-air line (for taking away the exhaust air from the second control valve)
107 connector for electric leads
108 sensor tower
109 electronic circuitry
110 pressure sensor
111 valve actuator
112 valve
113 throttle exhaust air (exhaust air)
114 throttle intake air (intake air)
115 exhaust-air line (exhaust air)
116 intake-air line (intake air)
121 control line (of the third control valve)
122 control line (of the first control valve)
123 control line (of the second control valve)
124 control line (of the process valve)
131 valve seat
132 valve stem
133 bypass in the valve housing
134 bypass in the valve member
135 notches in the valve seat
136 notches in the valve member
137 stop on the valve stem

DETAILED DESCRIPTION

Figure 2:
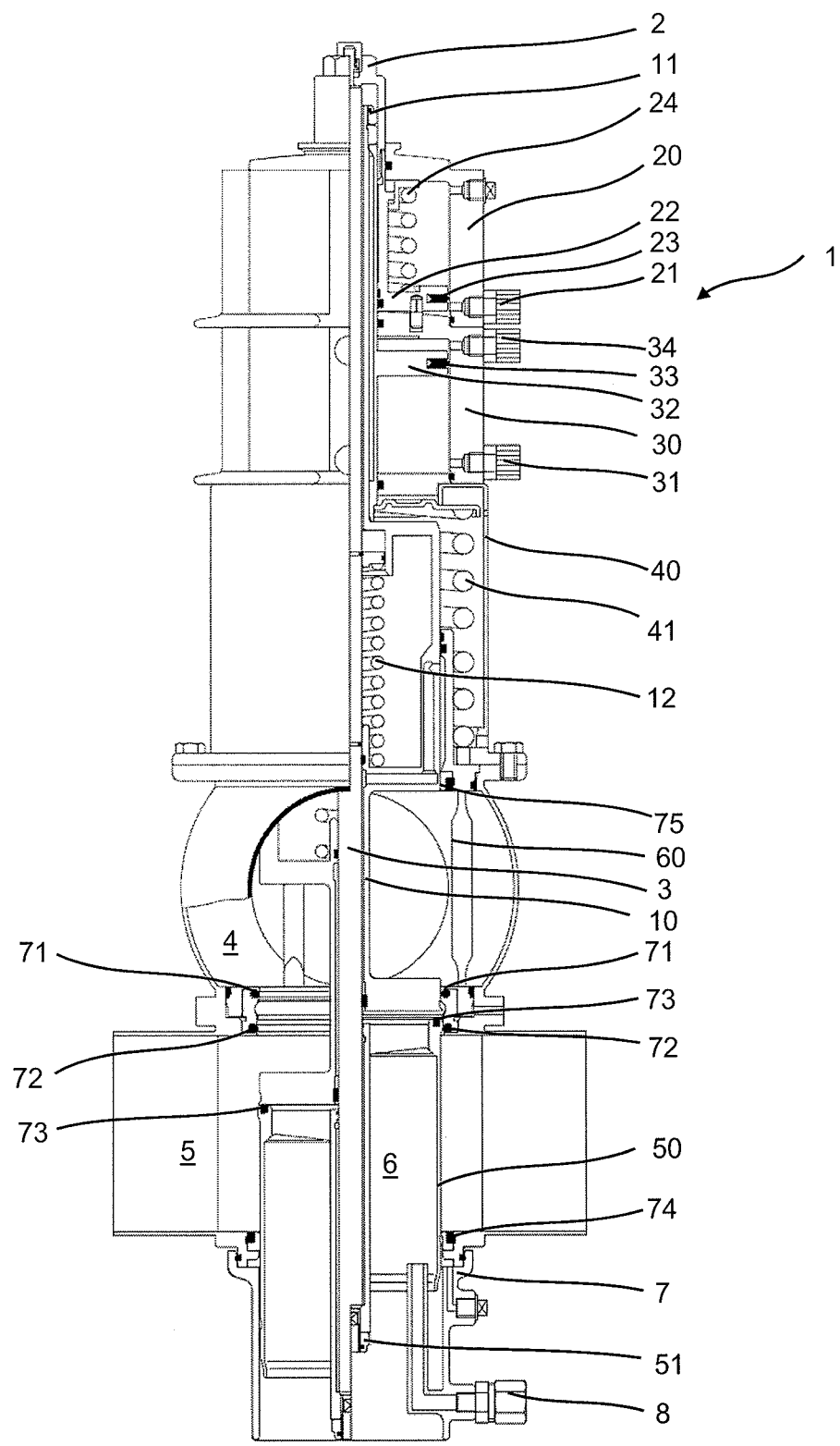
FIG. 2 is a partially cut-away side view of the double-seat valve of FIG. 1 without control unit, the left half showing the double-seat valve in its open position, and the right half showing the double-seat valve in its closed position.

FIG. 1 is the double-seat valve 1 of FIG. 2 in the closed position, and comprising a control unit, according to the invention, arranged in a housing having a cover.

FIG. 2 is a cross-sectional view of the double-seat valve represented in FIG. 1, the control unit shown in FIG. 1 not being represented, for reasons of clarity. The double-seat valve represented can be connected in known manner to a device, according to the invention, for actuating the process valve. A comprehensive description of a double-seat valve can be found in the product information sheet for the double-seat valve DELTA DA3+ of the present applicant, the content of which description is included in the present application by reference.

The stop screw 2 serves to position the lower valve stem 50 and the optical position indicator. The double-seat valve further has a connecting rod 3. Displaceably arranged in the cylinder 20 is a piston 22, which is sealed in respect of the cylinder 20 by means of a piston seal 23 and is biased downwardly by the return spring 24. The main cylinder 30 has a piston 32, which is sealed in respect of the cylinder 30 via the piston seal 33. The main cylinder serves to open the process valve in the one direction and to lift the upper valve stem in the other direction.

The upper valve stem 10 is coupled to the main cylinder 30 via the coupling 11, while the lower valve stem 50 is coupled to the connecting rod 3 via the coupling 51. Arranged in the upper valve stem 10 is the central spring 12, which positions the lower valve stem 50 in the closed position, via the connecting rod 3, by means of the central spring 12, the thrust ring and the disc spring.

A seat lantern 60 serves for the arrangement of a ring, which accommodates the upper seat seal 71 and the lower seat seal 72, and for the arrangement of the upper stem seal 75. The lower stem seal 51 is accommodated in a groove of the lower bottom plate of the valve housing.

The double-seat valve 1 has an upper valve stem 10 and a lower valve stem 50, which, in the closed position, are closed by the spring force of the main closing spring 41 arranged in the spring cylinder 40 and by the spring force of the central spring 12, and which separate media (products A, B and cleaning fluid) from each other in the pipelines 4 and 5. Between the valve stems 10, 50 and the drainage pipe 7 there is a leakage cavity 6, which allows leakage fluids or cleaning agents to freely drain off downwards in a pressureless manner.

The double-seat valve 1 is shown in the open position in the left half of FIG. 2, whereas it is shown in its closed position in the right half. In order to open the double-seat valve, the upper valve stem 10 is moved against the middle seal 73 through actuation of the control unit. For this purpose, compressed air is applied to the connector 34 of the main cylinder 30. This causes the leakage cavity 6 to be closed in respect of the pipelines 4 and 5. The two valve stems then move downwards into the open position, in which the pipelines 4 and 5 are connected to one another.

The double-seat valve DELTA DA3+ offers the possibility of cleaning all parts, including the seals that are in contact with product.

For the purpose of cleaning the upper valve region, cleaning fluid is introduced into the pipeline 4. The upper valve stem 10 is lifted through compressed air being applied to the connector 31 of the main cylinder 30, by means of the control unit. The upper valve stem 10 is raised upwards, contrary to the opening direction, the lift being limited by a metallic stop. Cleaning fluid flows over the upper seat seal 71 and the upper stem seal 75. At the same time, the leakage cavity 6 is cleaned. The cleaning fluid flows downwards in a pressureless manner.

For the purpose of cleaning the lower valve region, cleaning fluid is introduced into the pipeline 5. The lower valve stem 50 is lifted through compressed air being applied to the connector 21 of the cylinder 20, by means of the control unit. The lower valve stem 50 moves upwards, contrary to the opening direction, the lift being limited by a metallic stop. Cleaning fluid flows over the lower seat seal 72 and the middle seal 73, as well as the lower stem seal 74. At the same time, the leakage cavity 6 is cleaned. The cleaning fluid flows downwards in a pressureless manner.

The device, according to the invention, for actuating a process valve can be used, not only for the double-seat valve shown in FIG. 2 but, advantageously, for all process valves that are actuated by at least two control valve arrangements (typically solenoid valves), and to interconnect at least two pipelines, in which, typically, there are two differing foodstuff products, or one foodstuff product and a cleaning fluid.

Figure 3:
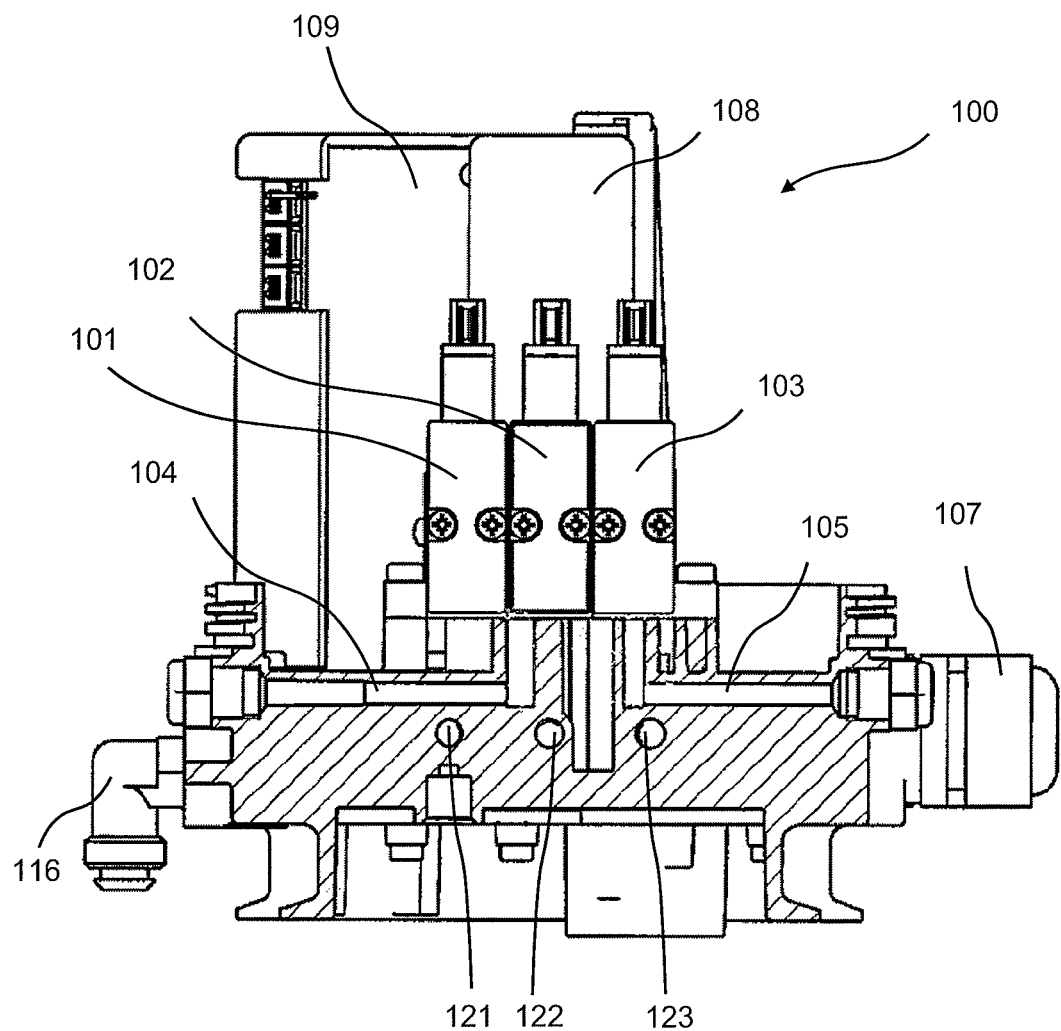
FIG. 3 is a cross-sectional view of a device, according to a first exemplary embodiment of the invention, for actuating a process valve.

FIG. 3 is a sectional view of a device, according to the invention, for actuating a process valve, according to a first embodiment of the invention.

The device 100, according to the invention, for actuating a process valve has a first control valve 102, which is used, for example, for lifting the upper valve stem. It furthermore has a second control valve 103, which is to be used, for example, for lifting the lower valve stem of the double-seat valve. In the case of the embodiment represented, the device, according to the invention, for actuating a process valve has a third control valve 101, which can be used, for example, for opening the double-seat valve.

The device 100, represented in FIG. 3, for actuating a process valve can be used, advantageously, with the double-seat valve shown in FIG. 2, as shown, for example, in FIG. 1. It is clear that the device, according to the invention, for actuating a process valve can also be used, advantageously, with other valves that have at least two cylinder chambers, that are to be actuated by differing control valves of a controller, that are to be actuated by differing control valves of a device for actuating a process valve, and in which unintentional actuation of one control valve by the exhaust air of the other control valve is to be prevented.

The control unit 100 according to the invention has two exhaust-air lines 104 and 105, which are separate from each other. In the case of the embodiment represented, the exhaust-air line 104 is intended for taking away the exhaust air of the first and the third control valve. The exhaust-air line 105 is intended for taking away the exhaust air of the second control valve 103. In the case of the double-seat valve shown in FIGS. 1 and 2, it is important that the exhaust air of the control valve for lifting the lower valve stem and the exhaust air of the control valve for lifting the upper valve stem be separated from each other, or that cross-flow be prevented, at least, in order to prevent unintentional opening. In the case of the represented device 100 for actuating a process valve, the separated exhaust-air line 104 and 105, which are realized in the bottom part of the housing of the device for actuating a process valve, is achieved through the provision. The base part of the partially represented housing of the device 100 for actuating a process valve is an injection-moulded part, in which the separated exhaust-air lines 104 and 105 are realized. The other components of the device 100, represented in FIG. 3, for actuating a process valve are known to persons skilled in the art, and can be varied according to the prior art. The device 100 for actuating a process valve has a sensor tower 108, in which a sensor measures the valve position for the purpose of further processing. Furthermore, electronic circuitry 109 is provided, for evaluating the sensor measurement result and the actuation of the control valves. The device 100, according to the invention, for actuating a process valve can further have a connector 107 for electric leads. Furthermore provided are connectors for lines to the cylinders of the double-seat valve.

Figure 4:
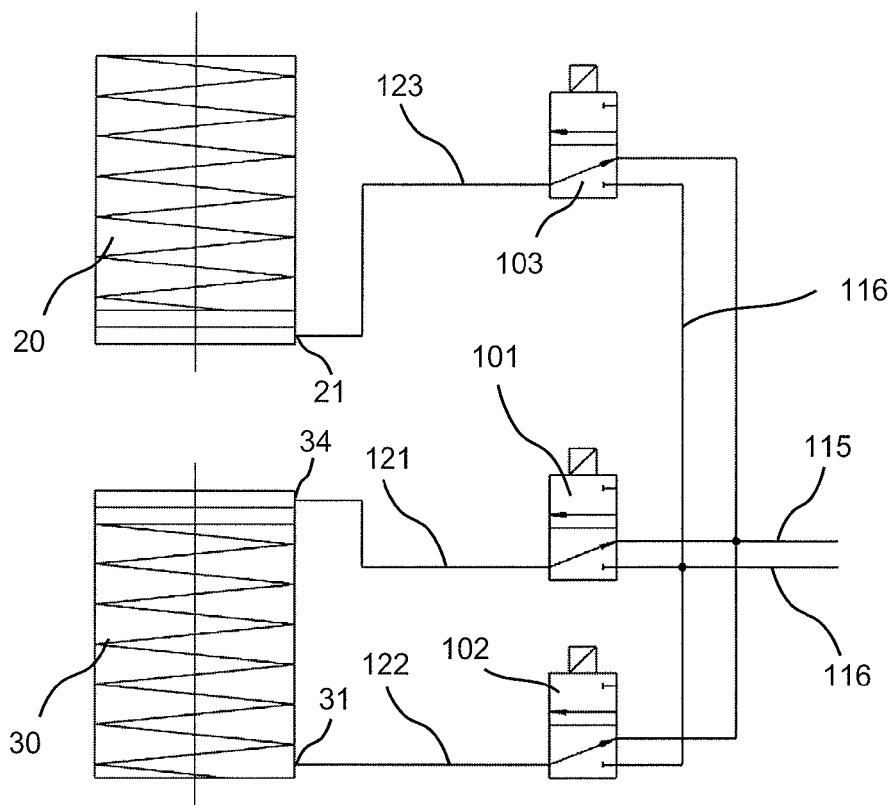
FIG. 4 is a schematic representation of the line arrangement of a known control unit.

FIG. 4 is a schematic representation of the lines of a known control unit. The control valves 101, 102 and 103 have a feed line 121, 122 and 123, respectively, which lead, respectively, to the connector 34 of the main cylinder for opening the process valve, to the connector 31 of the main cylinder for the upper seat lift, and to the connector 21 of the cylinder 20 for the lower seat lift. The cylinders 20 and 30 are represented schematically and can be realized, for example, according to FIGS. 1 and 2. The control valves 101, 102 and 103 are solenoid valves, which have intake-air line connectors that are connected to a common intake-air line 116. The control valves 101, 102 and 103 further have exhaust-air line connectors that are connected to a common exhaust-air line 115. Following actuation of a cylinder for the purpose of opening the process valve, or for lifting the upper or the lower valve stem, the exhaust air is routed outwards through the control valve 101, 102 and 103, respectively. In this case, the other control valves are not activated, i.e. the corresponding control lines are connected to the exhaust-air line. Owing to the connection of the exhaust-air line and the pressure that occurs on exhaust ventilation, there is a risk of the exhaust air building up pressure in the other control lines, which can result in unintentional actuation.

Figure 5:
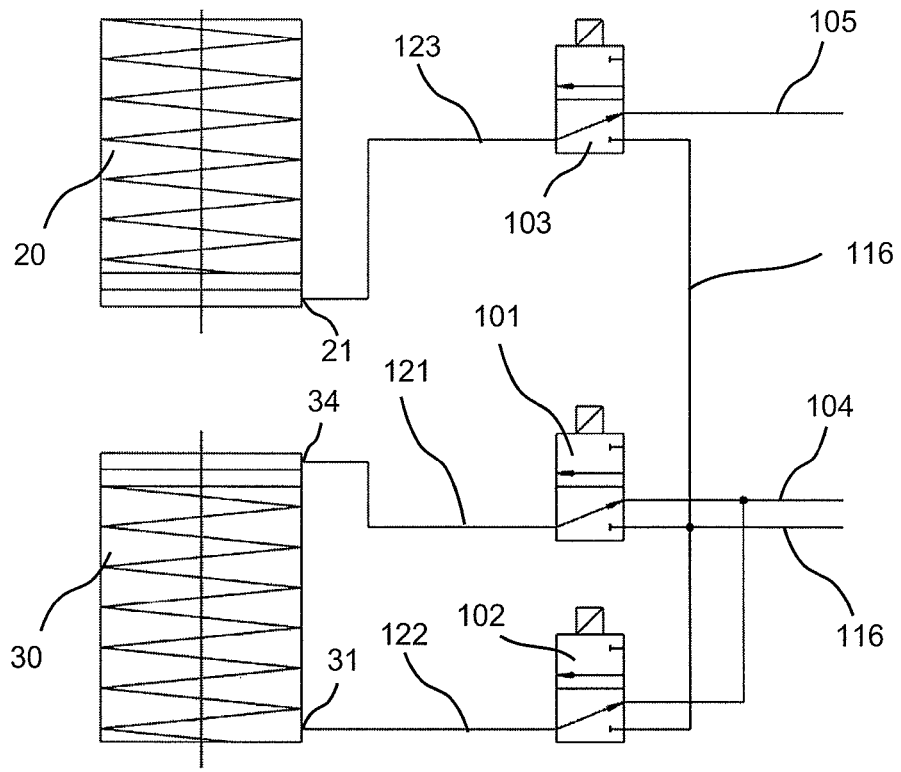
FIG. 5 is a schematic representation of the line arrangement of a device, according to the invention, for actuating a process valve, the device being connected to a double-seat valve.

FIG. 5 is a schematic representation of a control unit according to the invention, which corresponds substantially to FIG. 4. The differences are described in the following, reference being made otherwise to the description of FIG. 4. The control valve 103 has a separate exhaust-air line 105, which is connected to the exhaust-air line connector. The control valves 101 and 102 have a common exhaust-air line 104, which is connected to the corresponding exhaust-air line connectors of the control valves 101 and 102. Owing to the exhaust-air lines having been separated, there is no risk of compressed air being applied to the control valve 103 on exhaust ventilation of the control valve 101 or 102, and of unintentional exhaust ventilation of the lower valve stem. Likewise, on exhaust ventilation of the lower valve stem, there can be no unintentional opening of the process valve or unintentional lifting of the upper valve stem.

According to an alternative embodiment of the device, or control unit and/or circuit arrangement), according to the invention, for actuating a process valve, for appropriate double-seat valves it is also possible for the exhaust-air line of the control valve 101 to be connected to the exhaust-air line of the control valve 103, and for a separate exhaust-air line to be provided for the control valve 102. In this case, the exhaust-air lines of the first control valve 102 and of the second control valve 103 are separated from one another, such that unintentional lifting of the one control valve cannot occur on exhaust ventilation of the other control valve.

Figure 6:
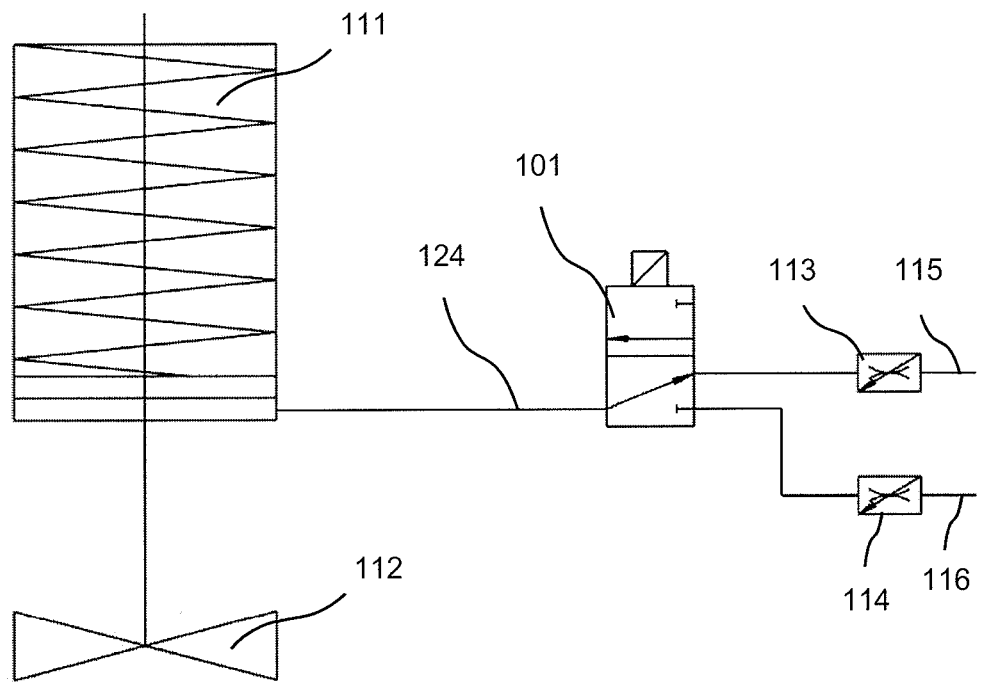
FIG. 6 is a schematic representation of a part of a device, according to a further embodiment of the invention, for actuating a process valve, the device being connected to a process valve.
Figure 7:
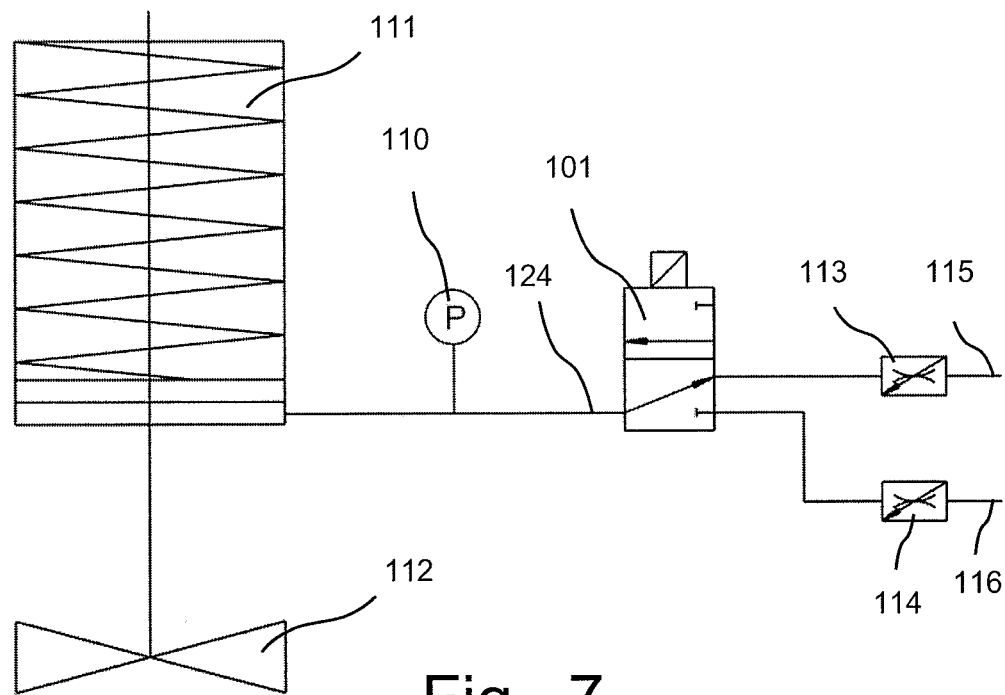
FIG. 7 is a schematic representation of a device, according to a further embodiment of the invention, for actuating a process valve, the device being connected to a process valve.

FIG. 6, through the example of the control valve 101, is the arrangement of throttle valves, according to the invention, in a device, according to the invention, for actuating a process valve. A throttle valve 114 for the intake air is provided in the intake-air line 116, and a throttle valve 113 for the exhaust air is provided in the exhaust-air line 115. A valve actuator 111, which initiates the opening and closing of a process valve 112, is actuated via a control line 124.

Clearly, in the case of a device, according to the invention, for actuating a process valve, it is possible for a throttle valve according to the invention to be provided only in the exhaust-air line or only in the intake-air line. The provision of a throttle valve according to the invention is important, in particular, in that line whose functioning ensures that the process valve is moved back to its safe position. Advantageously, throttle valves according to the invention are provided in both lines 115, 116.

Figure 8:
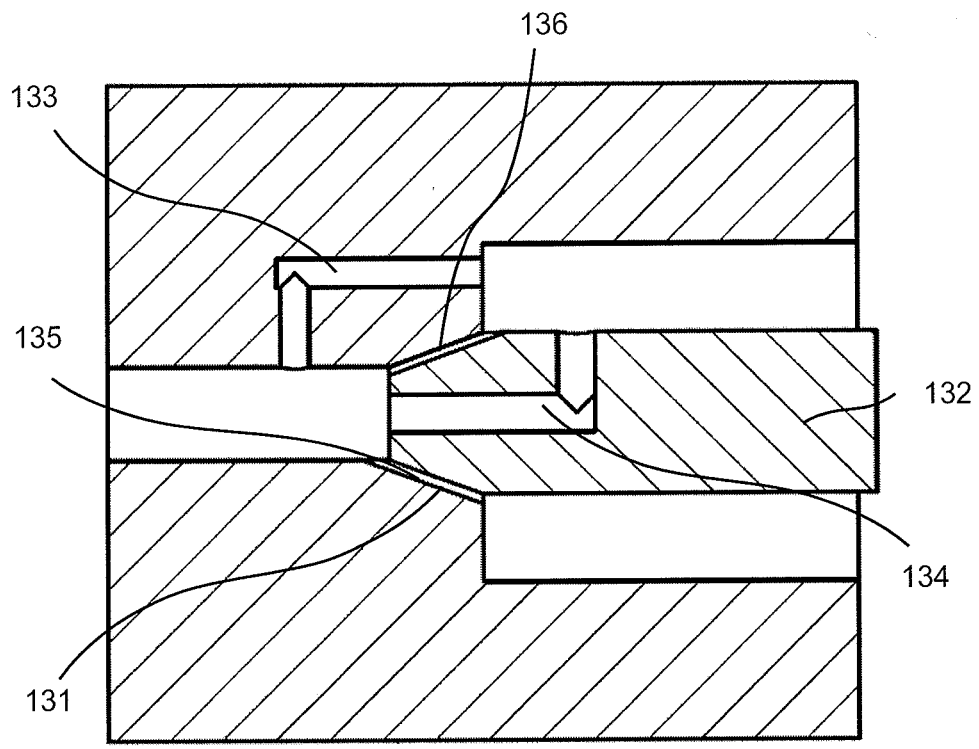
FIG. 8 is a cross-sectional view that represents simultaneously a plurality of variants of a throttle valve according to the invention, which throttle valve can be used, advantageously, in a device, according to the invention, for actuating a process valve.
Figure 9:
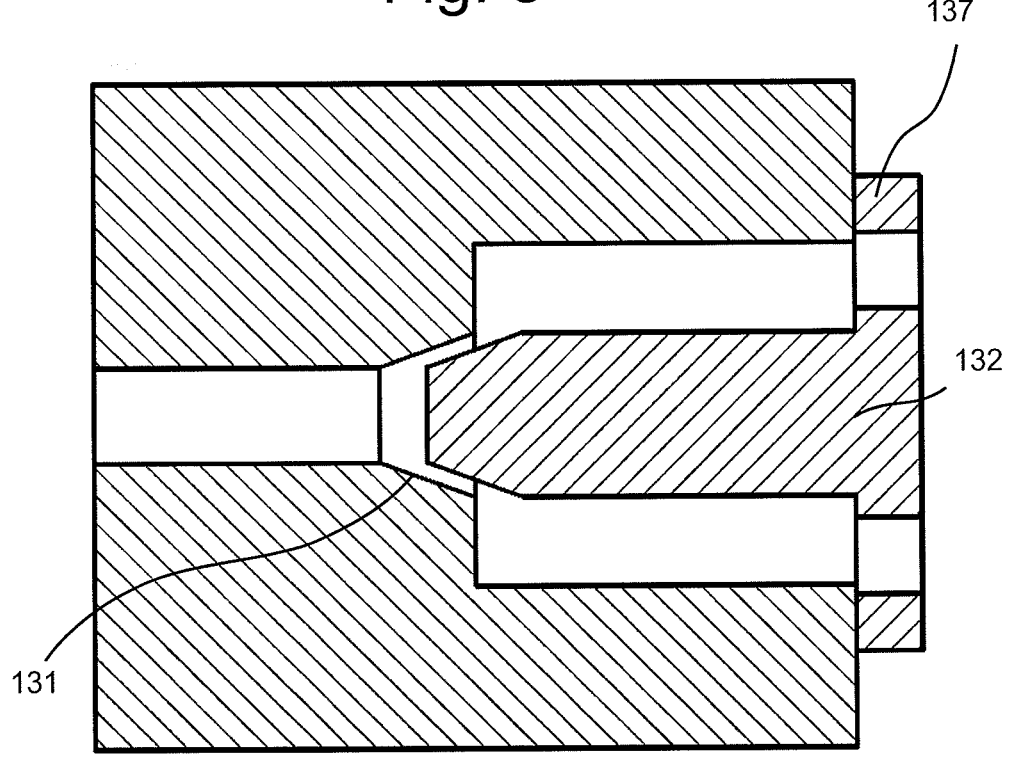
FIG. 9 is a cross-sectional view of a detail of a throttle valve according to the invention, which throttle valve can be used, advantageously, in a device, according to the invention, for actuating a process valve.

FIGS. 8 and 9 show possible embodiments of the throttle valves according to the invention. The throttle valve shown in FIG. 8 has a conical valve seat 131 and a valve stem comprising a frusto-conical head for engagement with the valve seat.

As shown in FIG. 8, a bypass 133 can be provided in the valve housing. Alternatively, or in addition, a bypass 134 can be provided in the valve stem. Alternatively, or in addition, notches or slots 135 can be provided in the valve seat and/or notches 136 can be provided in the closing member of the valve stem. Alternatively, or in addition, webs or ribs can be provided on the valve seat 131 or on the closing member of the valve stem 132.

As shown in FIG. 9, a stop 137 can be provided on the valve stem in order to prevent complete closing of the throttle valve. This measure can also be provided in combination with one or more of the measures shown in FIG. 8, in order to ensure a free minimum cross-section of the throttle valve.

According to the invention, any combination of these measures can be provided in order to ensure a free minimum cross-section of the throttle valve.

Alternative embodiments of the exemplary embodiments shown in the figures or described are conceivable. For example, a different pressure medium, or pressure gas, can also be used instead of a preferred actuation of the process valves by means of compressed air.

The invention is not limited to use in foodstuffs technology, but can also be used for other technical domains that have similarly stringent requirements in respect of cleanliness and process safety. The preferred domain of application, however, is that of foodstuffs technology.

The invention claimed is:

1. A throttle valve for limiting a maximum opening of a control valve that controls a process valve, the throttle valve comprising:
    a valve seat;
    a valve member, wherein the valve member is translated to a desired position in such a way that a minimum passage of a fluid, sufficient for controlling an actuation of the process valve, is ensured in each position of the valve member; and
    a housing, wherein the housing is provided in a line that is directly or indirectly connected to a control valve and the line is provided between a compressed air source for the control valve and the control valve, or between the control valve and an exhaust-air outlet, or between the control valve and a process valve.

2. The throttle valve according to claim 1, wherein the throttle valve is integrated in the control valve.

3. The throttle valve according to claim 1, further comprises a bypass opening.

4. The throttle valve according to claim 3, wherein the bypass opening is provided the valve member.

5. The throttle valve according to claim 1, further comprises notches in a valve seat.

6. The throttle valve according to claim 1, wherein stop means are provided to prevent complete closing of the throttle valve.

7. The throttle valve according to claim 6, wherein the stop means comprises a projection which is provided on a valve stem of the valve member and which cooperates with corresponding stops to prevent complete closing of the throttle valve.

8. A device for actuating a process valve, the device comprising:
    a throttle valve comprising
        a valve seat and
        a valve member, wherein the valve member is translated to a desired position in such a way that a minimum passage of a fluid, sufficient for controlling an actuation of the process valve, is ensured in each position of the valve member; and
    wherein the throttle valve is arranged in at least one intake-air line.

9. The device for actuating a process valve according to claim 8, wherein a plurality of the throttle valve is provided.

10. The device for actuating a process valve according to claim 8, wherein at least one pressure sensor is provided for monitoring a control pressure for actuation of the process valve.

11. The device for actuating a process valve according to claim 10, wherein a control valve arrangement comprises an intake-air connector, to which the intake-air line is connected, or an exhaust-air line connector, to which an exhaust-air line is connected, and a control line connector, to which there is connected a control line for connection to a valve actuator of the process valve for use in foodstuffs technology, the pressure sensor is provided in the intake-air line.

12. The device for actuating a process valve according to claim 11, further comprising a housing that comprises a bottom part, in which at least a portion of the intake-air line or of the exhaust-air line or of the control line is provided.

13. The device for actuating a process valve according to claim 12, further comprising a comparison device provided for comparing acquired measurement values of the pressure sensor with set reference values or with reference values stored in a storage device.

14. The device for actuating a process valve according to claim 13, wherein there is provided a storage device that is integrated in the pressure sensor and/or in the device for actuating the process valve.

15. The device for actuating a process valve according to claim 14, wherein the storage device is integrated in an electronic module of the device for actuating the process valve, which the electronic module is simultaneously provided and designed for supplying the pressure sensor and other sensors with energy and signals and for receiving and evaluating their measurement signals.

16. The device for actuating a process valve according to claim 15, wherein the pressure sensor is at least one of a piezoresistive pressure sensor, a piezoelectric pressure sensor, a frequency-analog pressure sensor, a pressure sensor having a Hall element, a capacitive pressure sensor, an inductive pressure sensor, and a pressure sensor having a strain gauge.

17. The device for actuating a process valve according to claim 16, wherein the pressure sensor has an analog output signal.

18. The device for actuating a process valve according to claim 17, further comprising an evaluation unit provided, for monitoring and evaluating the control pressure for actuation of the process valve.

19. The device for actuating a process valve according to claim 18, wherein a signal of the evaluation unit is displayed directly on a control unit and is relayed to a central control system of a programmable controller or to a process management system.

* * * * *